(12) United States Patent
Farchmin et al.

(10) Patent No.: US 8,321,591 B2
(45) Date of Patent: Nov. 27, 2012

(54) DIRECTORY STRUCTURE IN DISTRIBUTED DATA DRIVEN ARCHITECTURE ENVIRONMENT

(75) Inventors: David W. Farchmin, Grafton, WI (US); John J. Baier, Mentor, OH (US); Michael D. Kalan, Highland Heights, OH (US); Randall A. Marquardt, Waukesha, WI (US); Richard A. Morse, Hudson, OH (US); Stephen C. Briant, Moon Township, PA (US); Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 710 days.

(21) Appl. No.: 10/955,856

(22) Filed: Sep. 30, 2004

(65) Prior Publication Data

US 2006/0075066 A1    Apr. 6, 2006

(51) Int. Cl.
*G06F 15/16* (2006.01)
(52) U.S. Cl. ......... 709/245; 709/203; 709/224; 709/227
(58) Field of Classification Search .......... 709/217, 709/203, 227, 245; 707/1, 3, 4
See application file for complete search history.

(56) References Cited

U.S. PATENT DOCUMENTS

| | | | |
|---|---|---|---|
| 6,049,821 A * | 4/2000 | Theriault et al. ............. | 709/203 |
| 6,141,595 A | 10/2000 | Gloudeman et al. | |
| 6,477,434 B1 | 11/2002 | Wewalaarachchi et al. | |
| 6,518,980 B1 | 2/2003 | Demotte et al. | |
| 6,564,242 B1 | 5/2003 | Bonet et al. | |
| 6,571,140 B1 | 5/2003 | Wewalaarachchi et al. | |
| 6,691,106 B1 * | 2/2004 | Sathyanarayan ................. | 707/3 |
| 6,763,395 B1 | 7/2004 | Austin | |
| 7,401,054 B1 * | 7/2008 | Shah et al. ...................... | 705/51 |
| 7,496,668 B2 * | 2/2009 | Hawkinson et al. .......... | 709/227 |
| 2001/0011277 A1 * | 8/2001 | Martin et al. .................. | 707/100 |
| 2002/0112237 A1 * | 8/2002 | Kelts ............................... | 725/39 |
| 2002/0198937 A1 * | 12/2002 | Diwan et al. .................. | 709/203 |

(Continued)

FOREIGN PATENT DOCUMENTS

WO    0239238    5/2002

OTHER PUBLICATIONS

European Search Report dated Jan. 31, 2006 mailed Feb. 6, 2006 for European Patent Application Serial No. 05021345.3, 4 Pages.
Australian Search Report dated May 12, 2006 for International Application Serial No. SG 200506291-4, 4 pages.

(Continued)

*Primary Examiner* — Barbara Burgess
(74) *Attorney, Agent, or Firm* — Turocy & Watson, LLP; R. Scott Speroff; John Miller

(57) ABSTRACT

The invention employs systems and methods to provide addressing for appropriate access to data in automation devices. Data attributes can be related to a number of various factors in a data driven architecture such as the source of the data, the data subscriber and/or the path employed to convey the data from the source to the subscriber. In addition, data attributes can refer to the format, scale, units, length, visualization and transactional capabilities of the data. The subject invention can point to the appropriate address of the requested data wherein the data can have desired attributes associated therewith. In this manner, data can be selected based on the requirements of the requestor and/or the loading demands of network communication.

19 Claims, 12 Drawing Sheets

U.S. PATENT DOCUMENTS

| | | | |
|---|---|---|---|
| 2003/0018621 A1* | 1/2003 | Steiner et al. | 707/3 |
| 2003/0115207 A1* | 6/2003 | Bowman et al. | 707/100 |
| 2003/0184595 A1 | 10/2003 | Kodosky et al. | |
| 2004/0019636 A1* | 1/2004 | St. Pierre et al. | 709/203 |
| 2004/0030602 A1* | 2/2004 | Rosenquist et al. | 705/22 |
| 2004/0059811 A1* | 3/2004 | Sugauchi et al. | 709/224 |
| 2005/0028156 A1* | 2/2005 | Hammond et al. | 718/100 |

OTHER PUBLICATIONS

Wonderware "No More Islands of Automation" Hotlinks Magazine, vol. Winter, 2003, pp. 17-21, retrieved from internet, http://www.wonderware.com/products/appserver/NoMoreIslandsOfAutomation.pdf.

European Search Report dated Jan. 26, 2007 for European Patent Application Serial No. 05 02 1345, 6 pages.

* cited by examiner

DIRECTORY STRUCTURE IN DISTRIBUTED DATA DRIVEN ARCHITECTURE ENVIRONMENT

TECHNICAL FIELD

The subject invention relates to industrial control systems, and more particularly to systems and methods to provide addressing for appropriate access to data in automation devices.

BACKGROUND OF THE INVENTION

Industrial controllers are special purpose processing devices used for controlling industrial processes, machines, manufacturing equipment, and other factory automation applications. In accordance with a control program or routine, an industrial controller can measure one or more process variables or inputs representative of the status of a controlled process, and change outputs effecting control of the process. The inputs and outputs can be binary, (e.g., on or off), and/or analog assuming a continuous range of values. The control routine can be executed in a series of execution cycles with batch processing capabilities, and can comprise one or more functional units. Such a control routine can be created in a controller configuration system having tools and interfaces whereby a user can implement a control strategy using programming languages or graphical representations of control functionality. The control routine can be downloaded from the configuration system into one or more controllers for implementation of the control strategy in controlling a process or machine.

The measured inputs received from a controlled process and the outputs transmitted to the process can pass through one or more input/output (I/O) modules in a control system, which serve as an electrical interface between the controller and the controlled process, and can be located proximate or remote from the controller. The inputs and outputs can be recorded in an I/O table in processor memory. Input values can be asynchronously read from the controlled process by one or more input modules and output values can be written directly to the I/O table by a processor for subsequent communication to the process by specialized communications circuitry. An output module can interface directly with a controlled process, by providing an output from an I/O table to an actuator such as a motor, drive, valve, solenoid, and the like.

During execution of the control routine, values of the inputs and outputs exchanged with the controlled process pass through the I/O table. The values of inputs in the I/O table can be asynchronously updated from the controlled process by dedicated scanning circuitry. This scanning circuitry can communicate with input and/or output modules over a bus on a backplane or network communications. The scanning circuitry can also asynchronously write values of the outputs in the I/O table to the controlled process. The output values from the I/O table can be communicated to one or more output modules for interfacing with the process. Thus, a controller processor can simply access the I/O table rather than needing to communicate directly with the controlled process.

In distributed control systems, controller hardware configuration can be facilitated by separating the industrial controller into a number of control modules, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines.

Various control modules of a distributed industrial control system can be spatially distributed along a common communication link in several racks. Certain I/O modules can thus be located proximate a portion of the control equipment, and away from the remainder of the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values can be used by a processor (e.g., a PLC) for performing control computations.

In such control systems, data can be collected, analyzed and disbursed throughout a control architecture. In some instances, data related to a particular system and/or process can be conveyed to a user to inspect desired data values. Further, data can relate to multiple aspects of a particular process and can be channeled to a particular destination utilizing a number of means. Conventionally, data transmitted throughout a control architecture is sent to various requesters without regard to the effect of the overall performance of the network. In addition, the data can be delivered to a particular requestor wherein the data cannot be employed and/or the data must be first channeled through a middleware application to insure the data can be employed by the requesting application. Thus, what is needed is a technique to effectively locate and employ data throughout a control architecture.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The invention provides systems and methods to provide addressing for appropriate access to data in automation devices. The appropriate access to data can be accomplished via utilizing a Unified Plant Model hierarchy, determining the physical location of the data source and/or owner and looking to the logical address to access data based upon the role and requirements of the requestor. In a data driven architecture control and in-process information typically is made available and served from the data owner/source at the automation level, encapsulated as an object and served along with applicable attributes of the data to consumers of the data whether at the automation, MES and/or ERP levels of the information hierarchy. The handling and processing of this data information can be selectively transactional in nature. The attributes associated with this data can be as simple as a time stamp, or include units and data quality parameters, or include more sophisticated attributes such as various levels of visualization attributes and transactional processing support capabilities.

There can be various types of data sources with varying degrees of processing capabilities available to support a data driven architecture. Some data sources may only be able to directly provide data with perhaps a time stamp while others may be able to directly support transactional capabilities and still others may be able to support more extensive attributes such as HMI visualization attributes with varying degrees of sophistication. Some devices may be able to perform as servers adding attributes to data from other devices. Other devices may provide the function of 'proxy servers' for data in order to offload the data servicing requirements from automation devices for heavily used high overhead data. In this manner, data can have associated attributes that facilitate implementation of the data and also alleviate deleterious effects of overloading network communication.

According to one aspect of the invention, an industrial automation system that facilitates data exchange is employed that comprises a subscribing component that allows a party to request data from within a network and a directory interface that provides a network address for a data source based at least in part on one or more requirements of the requesting party, the one or more requirements are provided along with the request.

According to another aspect of the invention, a computer implemented method is utilized to provide addressing for appropriate access to data in automation devices, comprising requesting data from an industrial control network; searching data sources throughout the network for the data; selecting data sources based on attributes associated with the data; and receiving data from the address.

According to yet another aspect of the invention, a computer implemented method is employed to utilize data comprising locating data from a source within a network to be utilized with a requesting application; determining attributes associated with the data and the requirements of the requesting application; and implementing data connectivity with the requesting application.

According to still yet another aspect of the invention, a computer implemented method is employed comprising means for transmitting data to addresses throughout a data driven architecture; means for adding attributes to data based on addresses; and means for selecting data based on the attributes.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
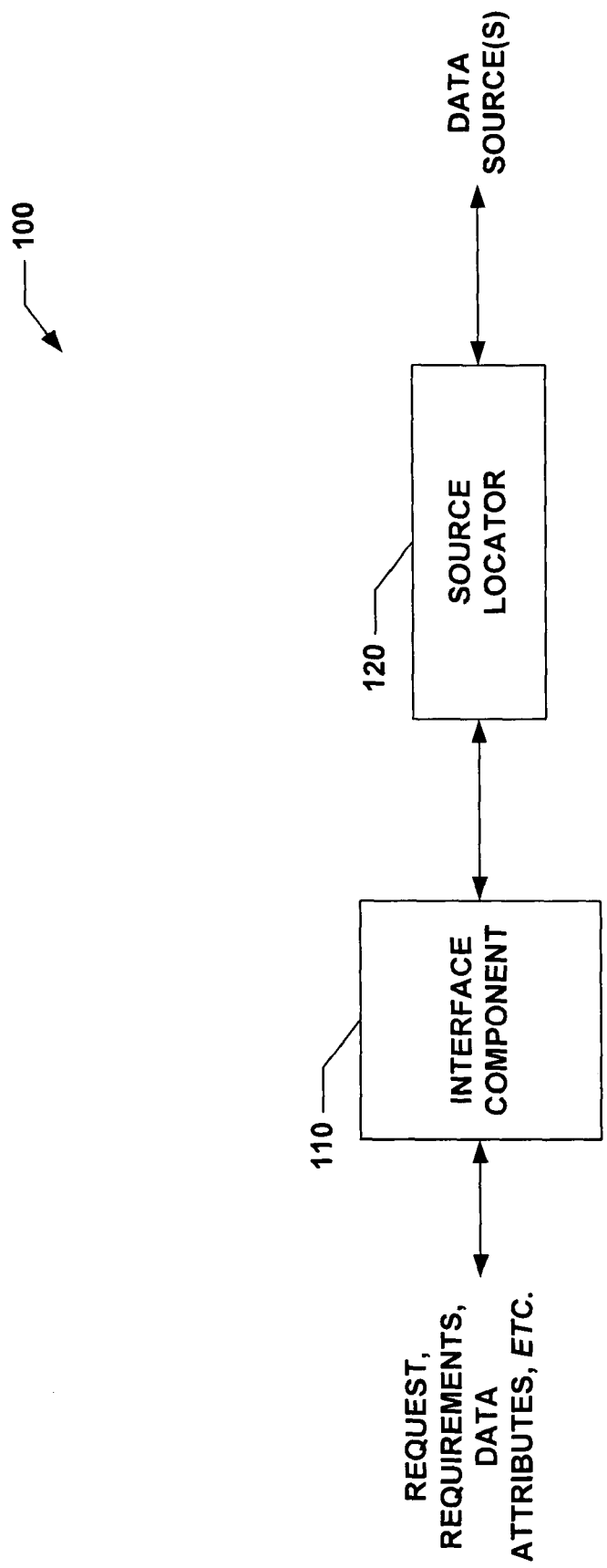
FIG. 1 illustrates an exemplary directory interface system in accordance with an aspect of the current invention.

The various aspects of the subject invention will now be described with reference to the drawings, wherein like reference numerals are used to refer to like elements throughout. The invention relates to systems and methods that provide addressing for appropriate access to data in automation devices. In such architecture, data can be received from any number of components, devices, systems, etc. throughout a factory, plant and the like. In addition, such architecture can provide various channels for information to be routed throughout the system such as servers, proxy servers, hubs and the like. In one aspect of the subject invention, the handling and processing of this data can be selectively transactional in nature. In addition, attributes associated with this data can be as simple as a time stamp or include units and data quality parameters, or include more sophisticated attributes such as transactional processing parameters, and various levels of visualization attributes.

Referring now to FIG. 1, an exemplary system 100 comprises an interface component 110 that interfaces to a source locator 120 in order to request and receive data from a source(s). The source locator 120 can be employed to provide the appropriate address (e.g., location) for the source of the data requested via the interface component 110. The source locator 120 can utilize various factors to make such a determination such as the type of requester employing the interface component 110, the location of the requester in a data driven architecture, the frequency of the data updates and requests, the format of the data and substantially any other attributes associated with the data. In this manner, the interface component 110 can submit a request to the source locator 120 wherein the source locator 120 locates and provides the appropriate source to the interface component 110.

The source locator 120 can receive information from any number of sources to which the source locator 120 is connected. For example, the source locator 120 can communicate with external devices located throughout a data driven architecture to receive information from various sources related to the control architecture of the system. Such information can be sent via a specific protocol or communication standard such as Ethernet, ControlNet, DeviceNet, Profibus, CAN bus or the like. Further, the communication can be accomplished via a wireless protocol such as wireless Ethernet, wireless LAN, Bluetooth, etc. In addition, the source locator 120 can receive data through various media such as twisted pair, coaxial cable, serial cable and the like. The source locator 120 can be a hardware interface such as a serial port, USB port, wire terminal, etc. or a hardware device such as wire, cable, port, etc. Alternatively, the source locator 120 can be software in nature such that data is received and transmitted to a software interface such as an API, for example.

The source locator 120 can receive requests for a source and provide one or more data points based upon the request. Such data points can be located substantially anywhere within a data driven architecture. For instance, a specific process point can be located in multiple locations throughout a data driven architecture. The process point can be located at the source of the data, at an industrial automation controller, a server and the like. Further, the data can have associated attributes that relate to visualization, transaction services, scaling, units and formatting of the data, for example. In this manner, the data attributes can provide needed information (e.g., metadata) to the interface component 110 in order to facilitate the proper processing, display, etc. of such data.

The interface component 110 can be employed to allow a requester (e.g., software application, database, user, etc.) to subscribe to a desired source. It is to be appreciated that the network can contain one or more memory banks (not shown), processors (not shown), controllers (not shown) and the like so that a particular data point can be stored in the network in multiple locations at substantially the same time. Further, each location can add one or more attributes to the data such the same data can be employed with a plurality of disparate subscribers to the data based upon the subscriber's requirements.

A listing of the data points on a particular network can be displayed to a user via the interface component 110 in a nested directory structure such that the data points are presented in a logical manner. The data points can be grouped based on various properties of the data such as physical location, function, output, process and the like. Moreover, data presentation can conform to a particular standard or format such as a Unified Plant Model (UPM) in accordance with the S88 standard, for example. Thus, each data point can be displayed as a single point even though the data point may be distributed throughout multiple locations (e.g., addresses) within a particular network.

In a data driven architecture, a directory can be employed. This directory can provide a logical depiction to the user of the devices in the factory, for example. This logical UPM depiction can be tailored to the vernacular and plant organization of the customers industry. The directory function can translate the logical view of the factory into physical locations and addresses needed for the required data access and associations to take place.

The source locator 120 can function as an intelligent coupling tool to effectively provide a particular data source to a subscriber wherein the subscriber can be provided a network address via a directory, for example. Such coupling can be transparent to the subscriber such that the subscriber is unaware of the address of the source of a requested data point. For instance, the subscriber can request a particular process point, wherein the value of the data can be delivered from any number of sources that have such a data value. The source locator 120 can utilize one or more factors to determine the address from which to retrieve the data such as the type of subscriber. For example, the subscriber can be a software application, an industrial controller, a user and the like. Thus, a software application can have different data requirements than an industrial controller and as such, the same data point can be provided from disparate addresses within a network.

An algorithm(s) can be employed to help facilitate coupling an appropriate source with an appropriate subscriber utilizing the source locator 120. For example, if the subscriber is an HMI, data with particular attributes can provide visualization formatting of the data. By way of further example, the subscriber could be a database (e.g., SQL Server, Oracle, etc.) employed with an ERP application wherein the data can require particular metadata and formatting for insertion into a desired database field.

Figure 2:
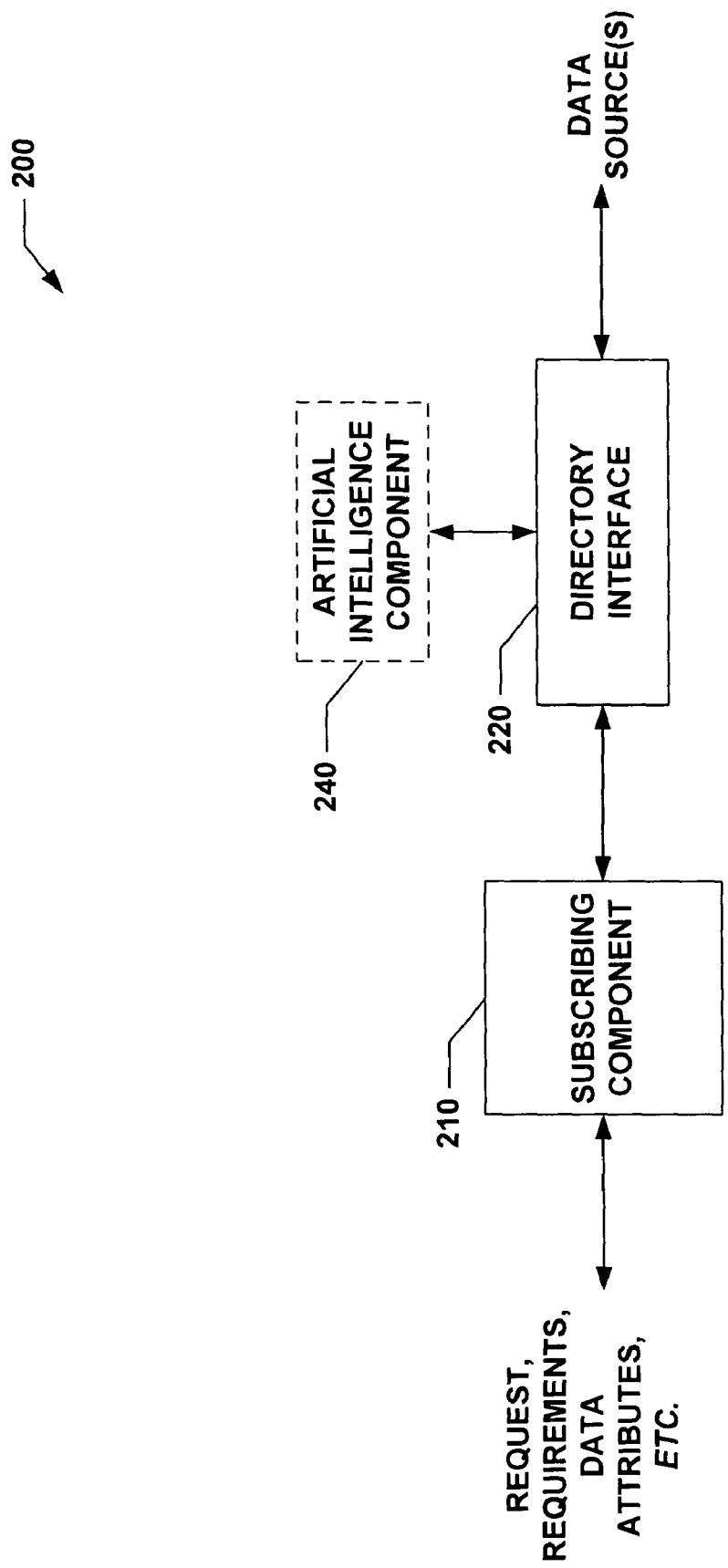
FIG. 2 illustrates an exemplary directory interface system with an artificial intelligence component in accordance with an aspect of the current invention.

Turning now to FIG. 2, a data exchange system 200 is illustrated that can provide an appropriate data source to a subscribing component 210 (e.g., interface component) via the directory interface 220 (e.g., source locator). An artificial intelligence (AI) component 240 can be employed to efficiently provide the appropriate address of data from one or more sources and can require proper identification of the subscribing component 210 by the directory interface 220 to insure that compatible data is employed from an appropriate address. Similarly, the source component can be employed to properly identify the existence and location of data in a network via the AI component 240.

In one aspect of the subject invention, the data location, as well as format, attributes, etc. of data can be generated by machine learning wherein one or more training sets of data with examples of desired results and/or undesired results for searches can be utilized to train the system. In another aspect of the subject invention, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query. In addition, knowledge of which results (e.g., data attributes) are most often requested for a particular data item can be used for configuring on which physical device or server the attributes are added for load balancing and system performance optimization. For example, a result that is accessed more times by the user can be deemed more useful to the user. In this manner, if a particular subscriber employs a specific data type more times than another, that data type can be utilized in the future.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion)

can be employed in connection with performing automatic and/or inferred action in connection with the subject invention.

In yet another aspect of the invention, a technique can be employed to anticipate the appropriate address of desired data. For example, information such as historical data representing data and attributes associated with such data has been utilized with various subscribers can be employed to predict a subscriber's preferred data type and/or location (e.g., address) of the data within a network. For example, intelligent based decisions based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the subject invention. In this manner, the AI component 240 can be employed by the directory interface 220 to provide decision making based on learned actions of a particular subscriber in relation to a particular source.

Figure 3:
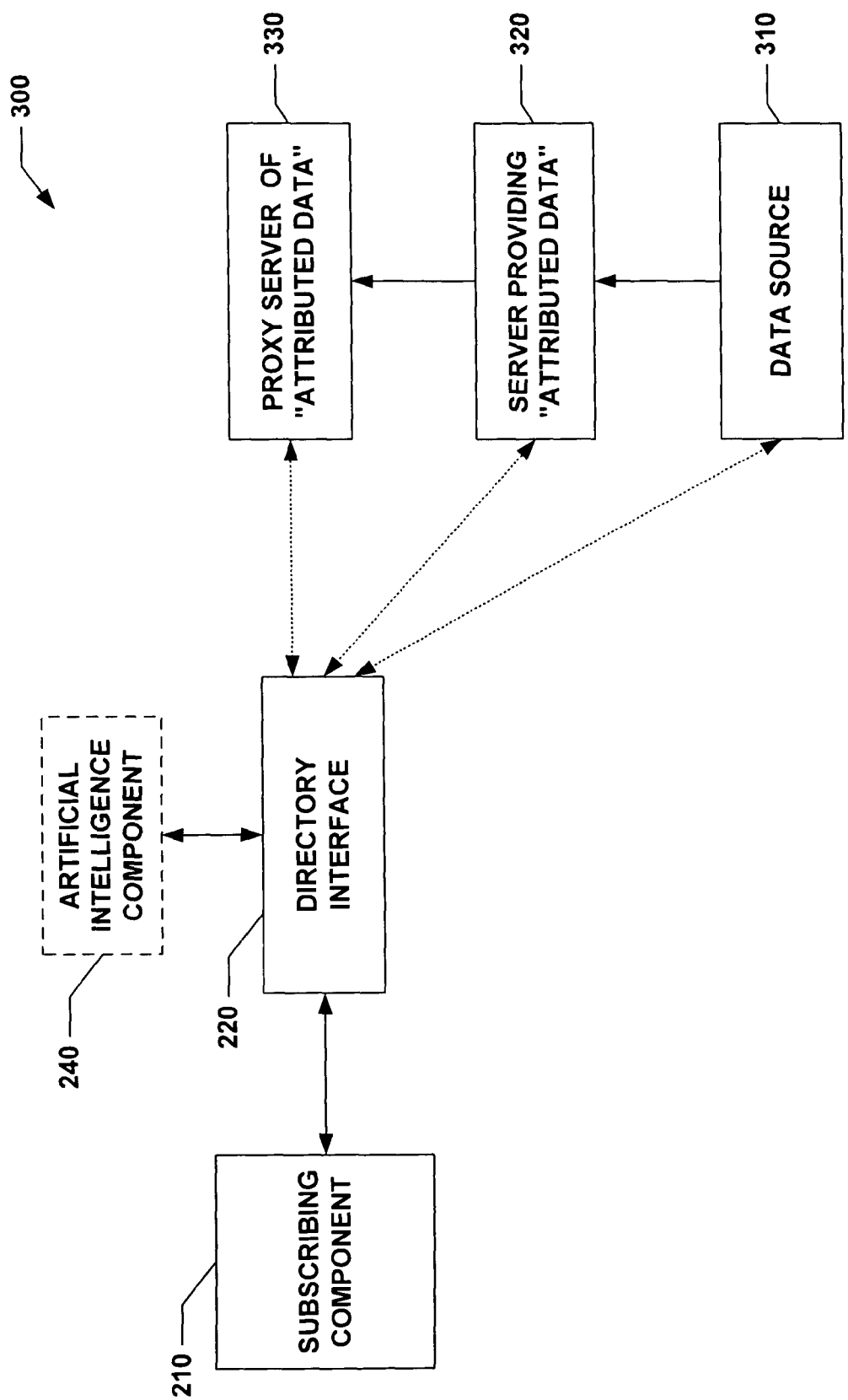
FIG. 3 illustrates an exemplary directory interface system with multiple data sources in accordance with an aspect of the current invention.

With reference to FIG. 3, a system 300 is shown that employs the directory interface 220 to provide an appropriate address for a particular data source to the subscribing component 210. The AI component 240 can be utilized to provide training to the directory interface 220 to program learned response(s) to various subscribers. The subscribing component 210 can provide a listing of data within one or more networks to facilitate access to such data regardless of the location within a network.

As shown, data from a particular data source 310 can be located in a plurality of addresses throughout a network, such as a data driven architecture. The data source 310 can be representative of data that is output directly from the component that is generating such an output. For example, the data source can be a sensor, an encoder, a switch, a drive, a motor, etc. that generates substantially any type of a readable output. Such output can include information such as volts, amperes, ohms, encoded as pulses, bits, ASCII, etc. The data source 310 can also provide additional information related to the output which can be specific to the data source 310. For example, an intelligent sensor may output not only a voltage data value that ranges from 0-10 volts but also the time at which such a data value was generated. Such additional information can be referred to as an attribute as employed in relation to the subject invention.

A directory can be employed in a data driven architecture. This directory can provide a logical depiction to the user of the devices in the factory, for example. In accordance with an aspect of the invention, this logical depiction can be based upon a Unified Plant Model (UPM), which is built upon industry standards such as S88. This logical UPM depiction can be tailored to the vernacular and plant organization of the customers industry. The directory function can translate the logical view of the factory into physical locations and addresses needed for the required data access and associations to take place.

Additionally, in a data driven architecture a directory must provide a logical view of the factory while resolving and/or providing necessary associations to physical location and/or device addressing information. The types of information required could include physical location of the data source/owner, physical location of the data subscriber, communications address for data source/owner and communications addresses for attributed data that can exist at multiple levels.

When data is required, addressing and associations to that data can be made with the directory system. For example, the user can select the data using a logical UPM depiction of the plant. Depending upon the application requesting the data, as well as the role and requirements of the user, the directory interface 220 can provide the appropriate addressing information to the required data. In some cases, such as automation device to automation device communications, the addressing might point directly to the data source/owner. In other cases, such as ERP human resources applications, the association may be to a proxy server of the attributed data so as to isolate the servicing of the data requests from the real time control processing of the automation device that is the data source. Note that the physical location associated with the data is that of the data source/owner while the communication address may be that of some other device on the network that is performing the role of adding attributes to the data or acting as a proxy server for that data.

Attributes associated with data can be added as such data is distributed throughout a network. Data can be sent to one or more locations such as server 320 or a proxy server 330. In this manner, the location (e.g., address) of the data can be employed to determine various attributes associated with data from a particular data source. For example, data sent to server 320 can provide attributes to data received such as formatting, schemas, scaling, factoring, units and the like. The attributed data sent from the server 320 can be sent to additional locations such as proxy server 330 wherein additional attributes can be associated with the data. Thus, data sent from a particular source can accumulate attributes as it is sent throughout a network architecture. Additionally, attributes can be substituted and/or reduced as data is directed to desired portions of a network. Data can be replicated such that identical copies of data (e.g., attributed, original, etc.) can be located on the same or disparate networks in multiple locations.

As utilized in this application, a server can refer to substantially any component wherein one or more data points can reside. For example, a programmable logic controller (e.g., Allen Bradley PLC5, SLC-500, MircroLogix, etc.) can be a server in accordance with an aspect of the subject invention. Such a server can scale data received to a particular data port (such as analog, digital, encoder, temperature, etc.) and transmit the data to another location as a scaled quantity utilizing particular units. For instance, a SLC-500 controller can receive a 7V signal from temperature sensor 1 of process 18. This signal can be scaled such that the data is output to a proxy server 330 as 450 degrees Celsius in a digital format.

Figure 4:
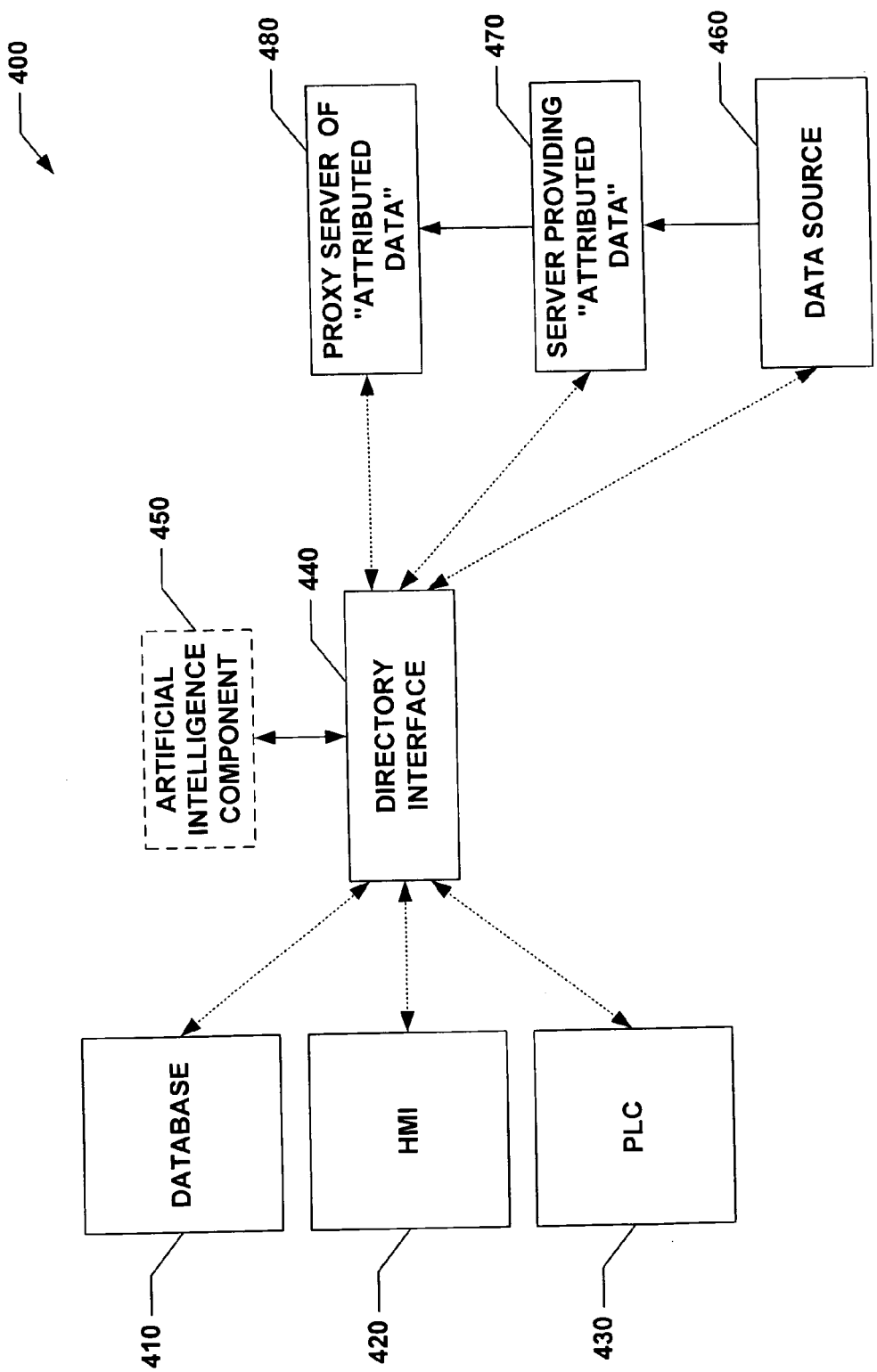
FIG. 4 illustrates an exemplary system that employs a directory interface system with a plurality of data requestors and data sources in accordance with an aspect of the current invention.

Referring now to FIG. 4 that shows an exemplary industrial automation network employed to transfer data to a database 410, a human machine interface (HMI) 420 and a programmable logic controller (PLC) 430 via a directory interface 440. As described supra, the directory interface can include an AI component 450 to facilitate efficient identification of desired data within a particular network. The directory interface 440 can be employed to provide data from an appropriate location such as the data source 460, a server 470 and/or a proxy server 480. In this manner, the directory interface 440 can point to a source of data based upon role and requirements (needs) of a requester (e.g., database 410, HMI 420, PLC 430, etc.)

The database 410 can be any number of various types such as a relational, network, flat-file or hierarchical systems. As known in the art, a flat-file database is a relatively simple database system in which each database is contained in a single table. In contrast, a relational database system can use multiple tables to store information, and each table can have a different record format. In addition, unlike flat-file database systems, relational systems can be spread across several tables. Exemplary relational databases include SQL, Oracle and the like.

It is to be appreciated that databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 440 can provide data to the database 410 from the server 470, which provides data with the attributes desired by the database 410.

The HMI 420 can employ the directory interface 440 to point to data located within the system 400. An HMI can be employed to graphically display various aspects of a process, system, factory, etc. to provide a simplistic and/or user-friendly view of the system. In this manner, various data points within a system can be displayed as graphical (e.g., bitmaps, jpegs, vector based graphics, clip art and the like) representations with desired color schemes, animation, and layout.

In accordance with an aspect of the subject invention, the HMI 420 can request data to have particular visualization attributes associated with data in order to easily display such data to the HMI 420. For example, the HMI 420 can query the directory interface 440 for a particular data point that has associated visualization attributes. The directory interface 440 can determine the proxy server 480 contains the attributed data point with the desired visualization attributes. For instance, the attributed data point can have a particular graphic that is either referenced or sent along with the data such that this graphic appears within the HMI environment instead of or along with the data value.

The PLC 430 can be any number of models such as Allen Bradley PLC5, SLC-500, MicoLogix, etc. The PLC 430 is generally defined as a specialized device employed to provide high-speed, low-level control of a process and/or system. The PLC 430 can be programmed using ladder logic or some form of structured language. Typically, a PLC can utilize data directly from a data source (e.g., data source 460) that can be a sensor, encoder, measurement sensor, switch, valve and the like. The data source 460 can provide data to a register in a PLC and such data can be stored in the PLC if desired. Additionally or alternatively, data can be updated (e.g., based on a clock cycle) and/or output to other devices for further processing.

Figure 5:
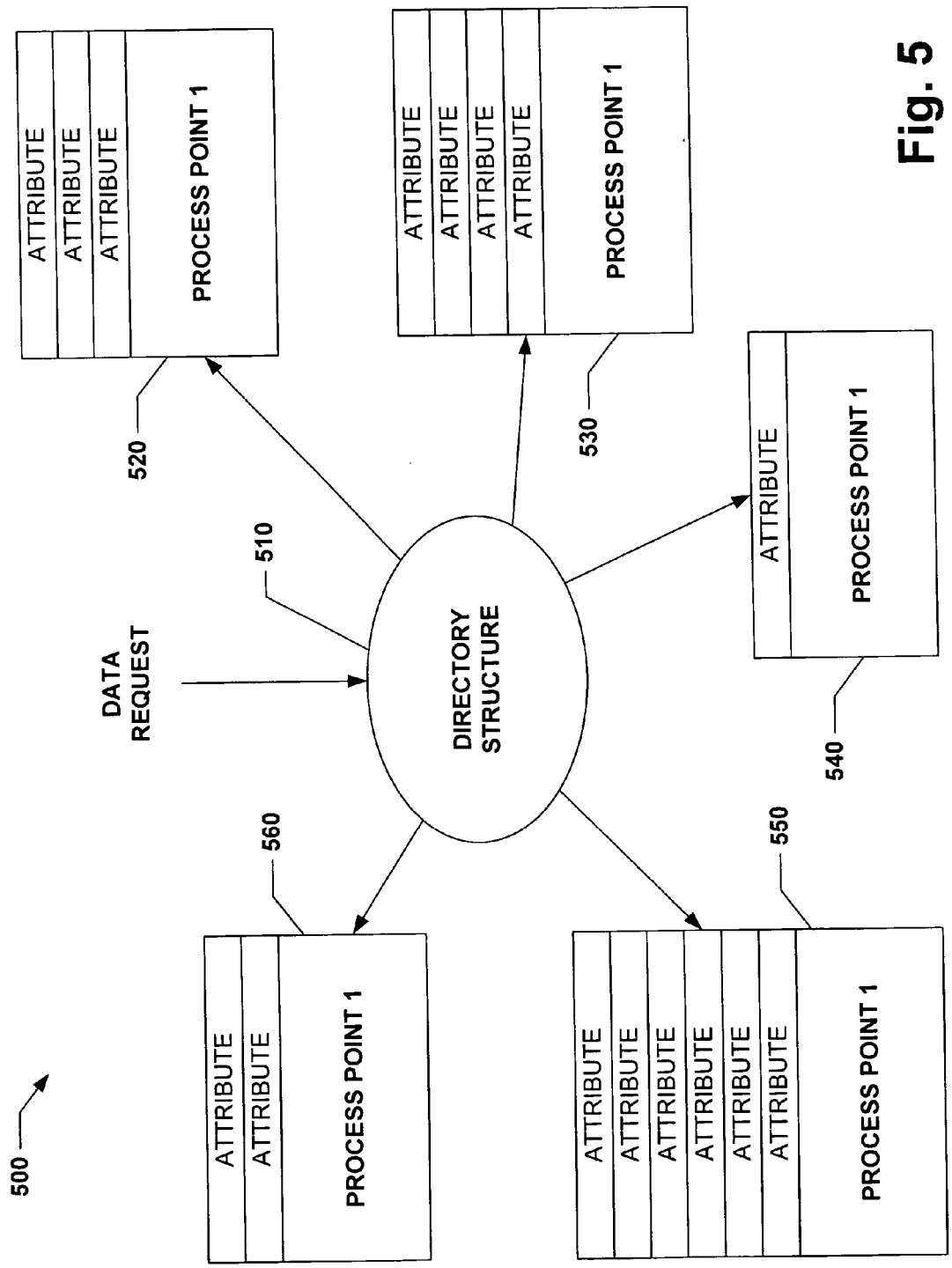
FIG. 5 illustrates a directory structure system in accordance with an aspect of the current invention.

Turning now to FIG. 5, a system 500 is shown that depicts a directory structure 510 that is utilized to receive a data request. The directory structure 510 can provide a logical view of a plurality of data points within a control architecture, for example. The data request can be sent from any number of entities such as a database, user, ERP application, HMI, and the like. Additionally, the data request can contain identifying information relative to the needs of the party making the data request. For example, the data request can be for "process point 1" 520-560 wherein the request is made from an HMI application. The directory structure 510 can then locate and identify "process point 1" 520-560 within the control architecture based on the needs of the HMI applications.

As shown, "process point 1" 520-560 is shown with association to one or more attributes. Each attribute can relate to the format, visualization, frequency, etc. of the data. Thus, "process point 1" 540 contains a single attribute that can relate to the scale of the data, such as 1-5 volts DC. In contrast, "process point 1" 520 has three attributes which can be associated with not only the scale of the data, but the units of the data (e.g., inches) and the color (e.g., blue, silver, red, etc.) of the data as it appears in the HMI making the data request.

It is to be appreciated that the directory structure can present data within a particular system (e.g., network, factory, process, etc.) to user in a number of ways. For example, the directory structure can be a nested directory, a map of a plant floor, a spreadsheet and the like. In this manner, the data can be presented in a manner that is most easily accessible to a particular user such as a logical depiction, by network address, by physical location and the like. Further, it is to be appreciated that only one instance of each data point is shown to a party requesting data even though several instances (e.g., with various attributes associated therewith) are located within a control architecture. Thus, when a request is made for a particular data point (e.g., "process point 1"), the directory structure couples the data requester to the data without showing the number of instances or the methodology employed to choose the data. In this manner, the requester is unaware of such data selection and sees only the data requested that contains the proper attributes associated therewith.

Figure 6:
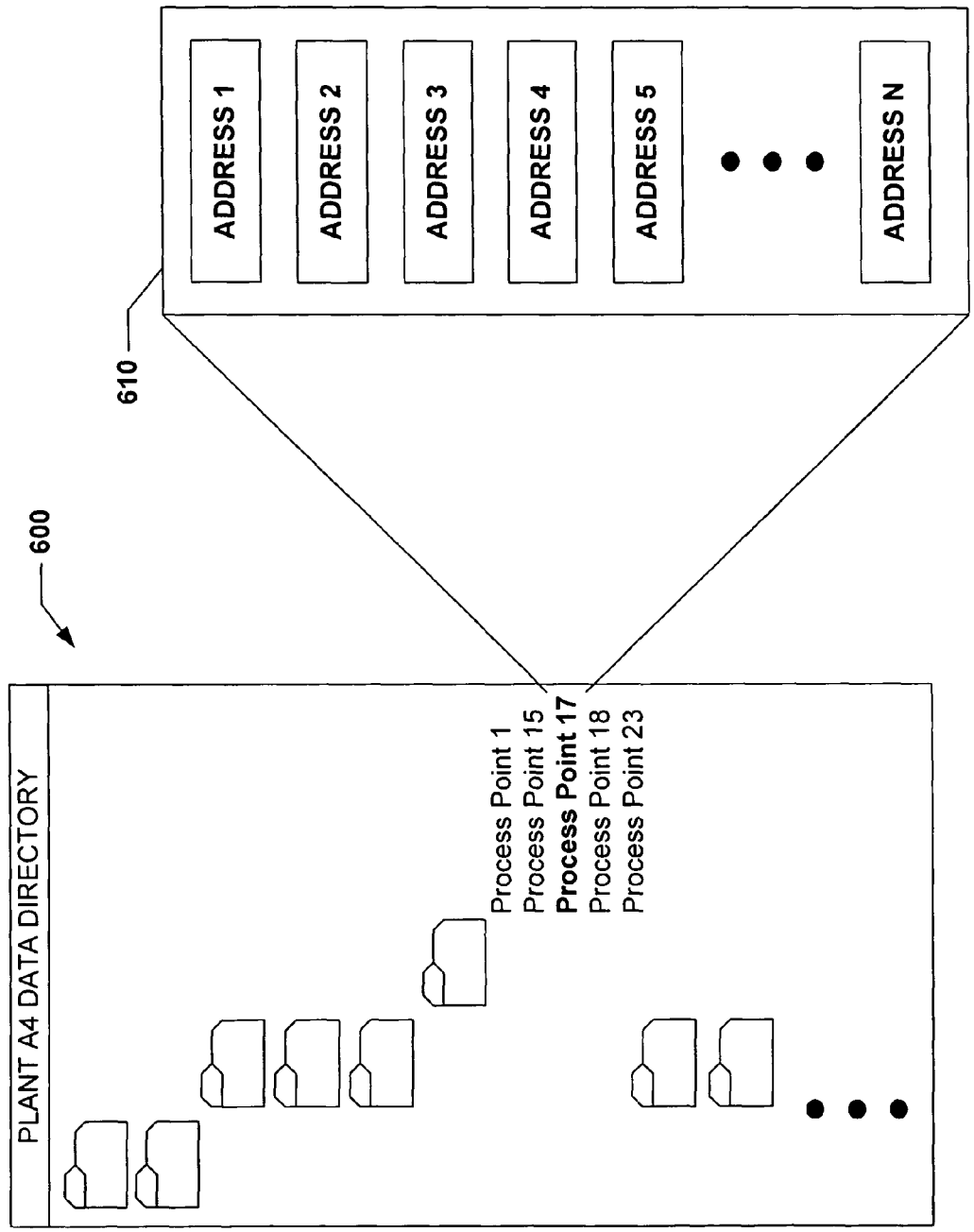
FIG. 6 illustrates a data directory system with an address list in accordance with an aspect of the current invention.

FIG. 6 illustrates a data directory system 600 wherein a nested tree structure is employed to present substantially all data points within a Plant A4. In this data directory, data can be organized in accordance with the Unified Plant Model, or various standards such as S88 and the like. As shown, the data points can be organized in a hierarchical manner related to logical control grouping, network addressing and/or physical location of the data. It is to be appreciated that although the data is shown in a nested tree structure, such data can be organized in any manner desired such as a flow diagram, a plant floor map, an IP address list and the like.

As shown, the data directory system 600 contains a "Process Point 17" contained in a listing of disparate process points. When a user selects "Process Point 17," an addresses list 610 appears that depicts substantially all the locations of "Process Point 17" throughout the Plant A4's control architecture. The address list 610 can contain a listing (1–N, where N is an integer greater than or equal to 1) of various locations of a particular data point. Additionally, data attributes (not shown) associated with each of the addresses within the address list 610 can be displayed to the user. In this manner, the user can select an appropriate instance of "Process Point 17" from the address list 610 based on any number of factors as referenced above. It is to be appreciated that although this system involves the manual selection of data at a particular address by a user, such a selection can be made automatically by the data directory system 600 after a particular data point has been chosen.

Figure 7:
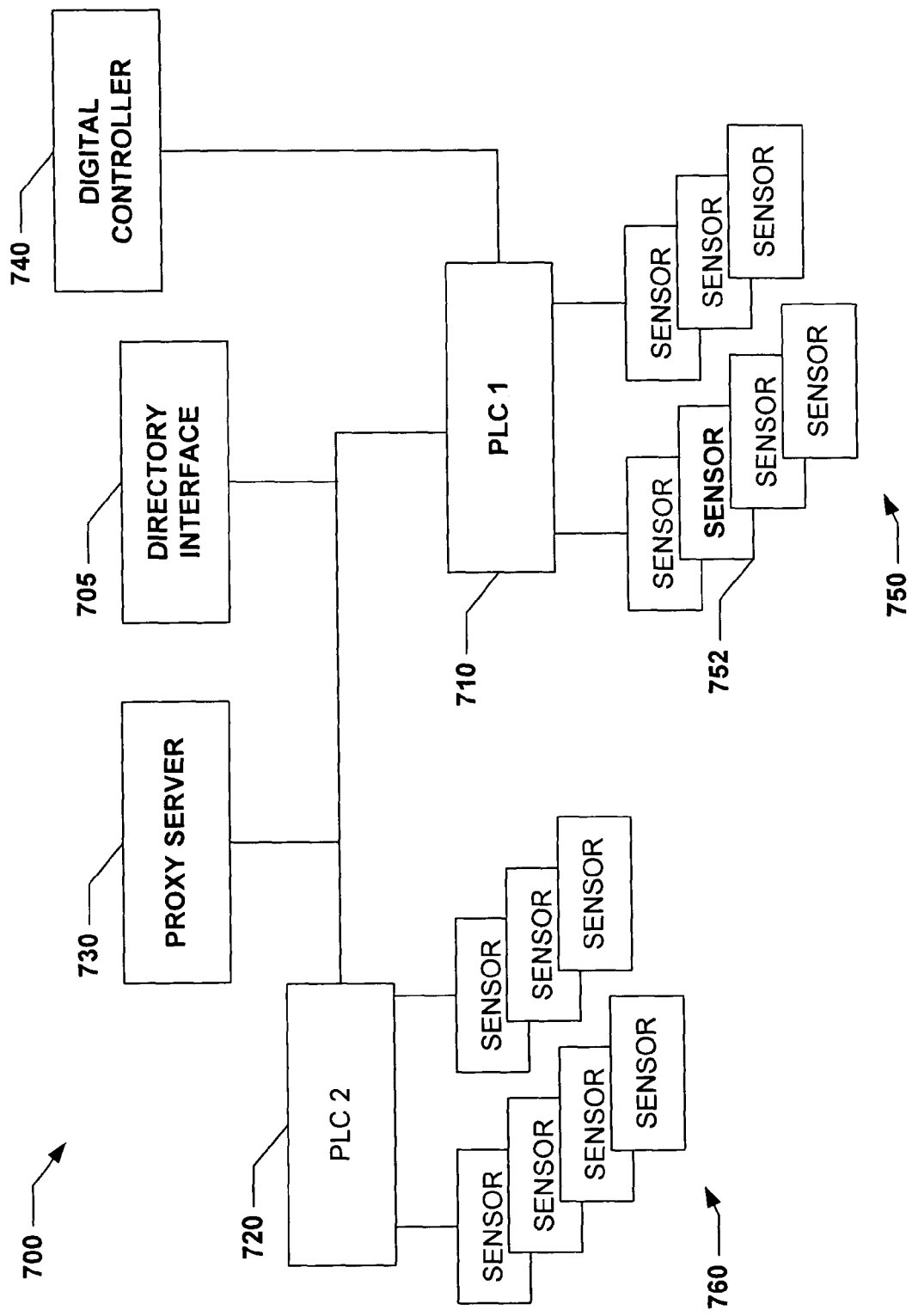
FIG. 7 illustrates an exemplary control architecture in a network environment in accordance with an aspect of the current invention.

With reference to FIG. 7, which shows an exemplary control architecture that contains a directory interface 705, a PLC1 710, a PLC 2 720, a proxy server 730 and a digital controller 740. Additionally, PLC1 710 has a plurality of sensors 750 and PLC2 720 has a plurality of sensors 760 associated therewith. As shown, the data source, sensor 752, is distributed throughout the control architecture 700 to various addresses (physical, communication, logical, etc.). In this example, the data from sensor 752 is also stored at PLC 1 710, proxy server 730 and digital controller 740. Generally, a proxy server (such as proxy server 730) is employed to offload communication demands that can be placed on various associated servers (such as PLC1 710 and PLC2 720). Due to communication demands, etc. of a control system, data may not be updated as quickly at a proxy server as it would at a PLC, for example. However, the proxy server may provide data that is transactional in nature such that the handling and processing of the data can be more robust (and as a consequence updated less frequently). In comparison, data from a PLC can be updated more quickly but may not have the safeguard of data transmission that a transactional process can offer.

In light of such control architecture constraints, a data request employed with a directory interface 705 can determine the needs of the data requestor related to data format, attributes, visualization, frequency of delivery, transactional nature and the like to determine what data location in the control system 700 the data should be pointed. In this manner, the use and operation of the directory interface 705 in a data driven architecture can be critical to providing the ease of use to the user and the hierarchical access to data in a factory. The directory interface 705 can respond to critical dynamic load balancing of the automation level computing resources (e.g., PLC1 710, PLC2 720, proxy server 730, digital controller 740, etc.) in the factory such as the addition of a proxy server and the dynamic redirecting of appropriate data requests to the proxy server 730, offloading other data service resources. In this manner, the directory interface 705 is tasked with choosing appropriate data location by taking into consideration the resource loading of a network within a factory, for example.

Figure 8:
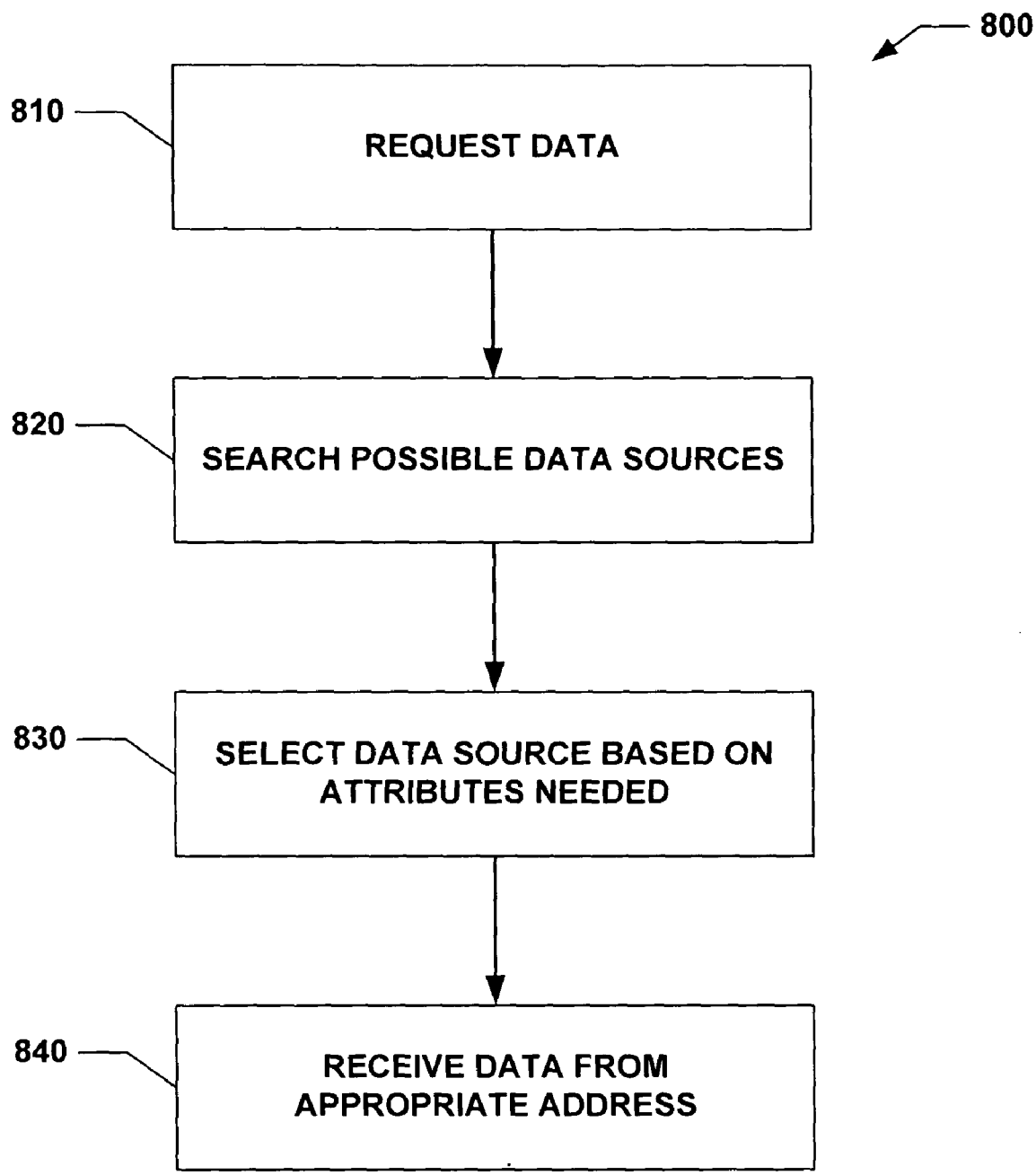
FIG. 8 illustrates an exemplary methodology that receives data from an address in accordance with an aspect of the subject invention.
Figure 9:
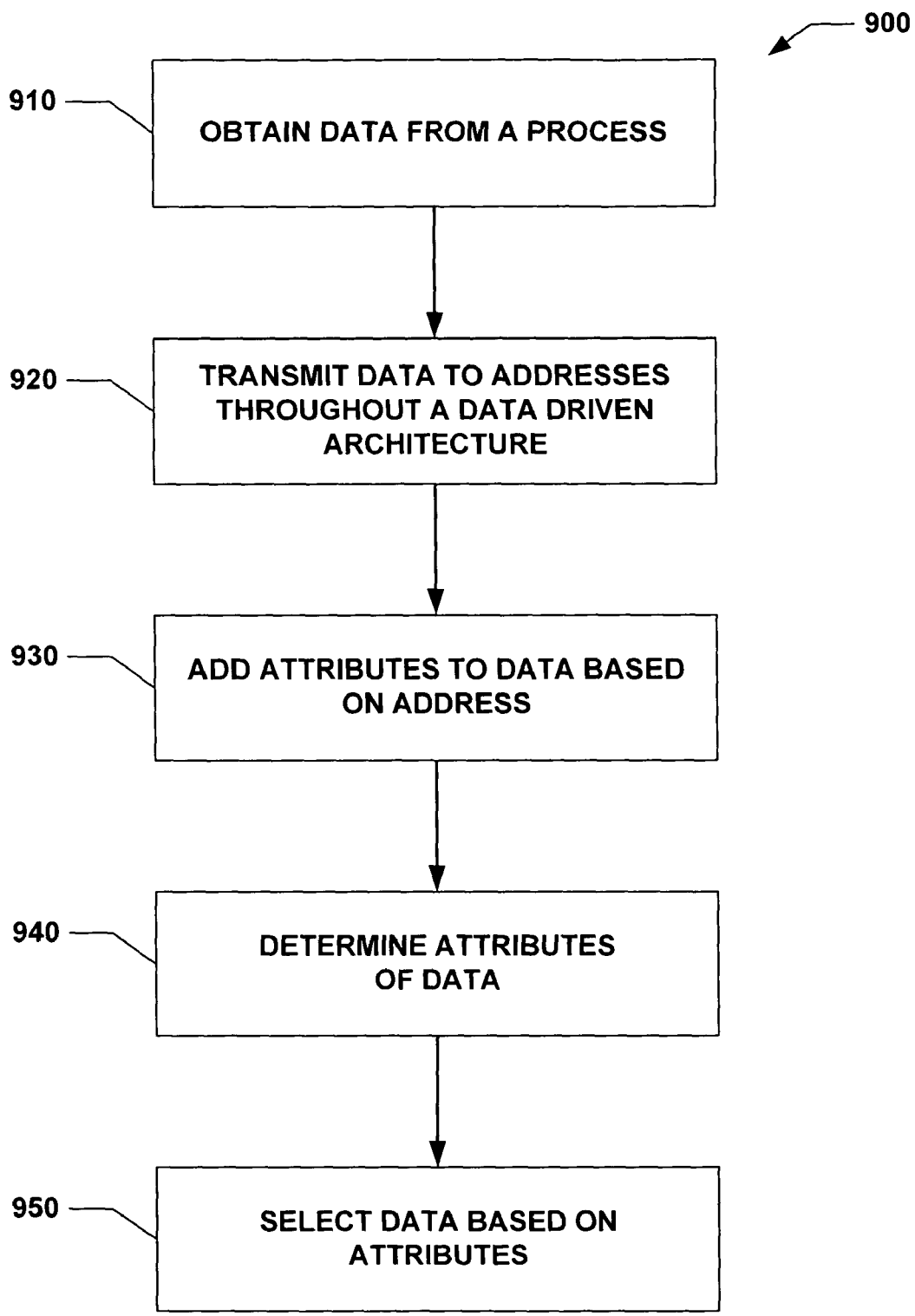
FIG. 9 illustrates an exemplary methodology that selects data based on associated attributes in accordance with an aspect of the subject invention.
Figure 10:
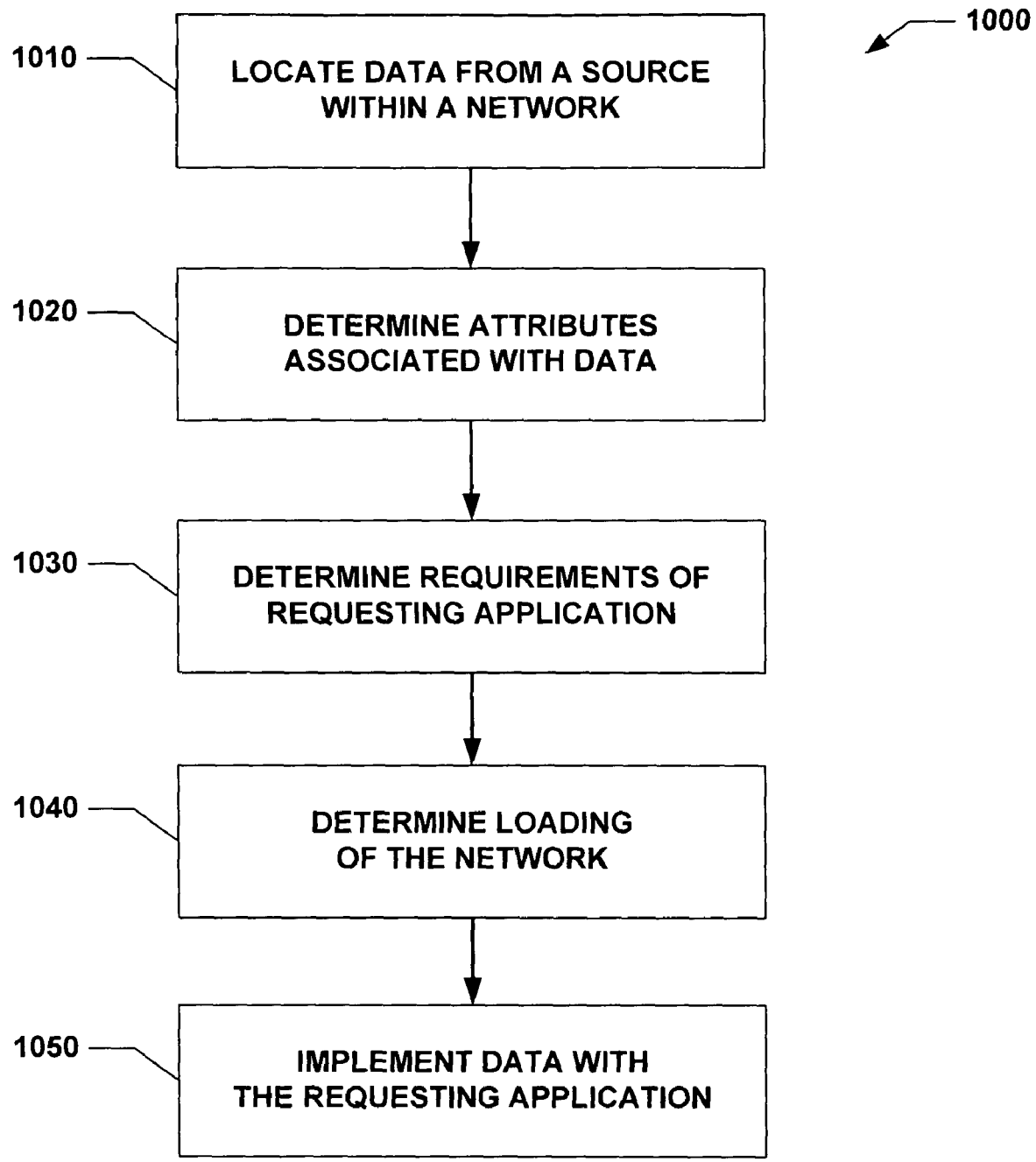
FIG. 10 illustrates an exemplary methodology that implements data with a requesting application.

FIGS. 8, 9 and 10 illustrate methodologies 800, 900 and 1000 in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

Referring now to FIG. 8, illustrated is a methodology 800 employed to receive data from an appropriate address. At 810, data is requested by a party that can employ one or more data points from a desired system, control architecture, etc. wherein such data is located. The request can be made based on a condition, one time or on a periodic basis and can be made utilizing any number of communication protocols such as ControlNet, DeviceNet, Profibus, Ethernet and the like. Further, various media can be employed to transmit such a request such as wired (e.g., coaxial cable, twisted pair, etc.) and/or wireless technologies (e.g., infrared, wireless Ethernet, Bluetooth and the like).

At 820, a search of possible data sources is performed that can meet the request. The search can include data sources from one or more networks and/or systems. This search can be limited in scope to a particular section, data type, location, etc. of a system based on the request. At 830, data is selected from the possible data sources based on the attributes needed by the requestor. Such attributes can refer to the length, scaling, units, graphics, visualization, format, etc. of the data. For example, a particular application making a request for data may have specific needs to facilitate processing of such data. Since the has attributes associated with it, the need for a middleware application (e.g., MES application) to pre-process and deliver the data is mitigated.

At 840, data is received from an appropriate address. It is to be appreciated that the address of the data can refer to the communication address, logical address and/or physical address of the data. The appropriate address can be the location of the data where the data has particular attributes required by the data requester. In this manner, the address of the data can be determined based on the requestor and the type of data needed by the requester. Data can be received in any number of communication methods and/or protocols including ControlNet, DeviceNet, Ethernet, Wi-Fi, etc.

FIG. 9 shows an exemplary methodology 900 wherein data is selected based on attributes. At 910, data is obtained from a process. The process can be related to various operations and/or methods associated with industrial control, for example. Such industrial control can be employed to monitor and/or control manufacturing, production, quality, finishing, building, etc. operations, for example. In addition, data can be obtained utilizing a processor, a terminal, a digital control system, a computer and the like. Such data can be transmitted to the gathering device at specific times, or as desired by the user. The data can be related to various units of measure and be scaled to minimum and maximum limits as desired by the user. For example, the data can be in volts, amperes, ohms, pulses, etc. and can be gathered in accordance with specific protocols such as ASCII, digital, analog, and the like.

At 920, the data is transmitted from the process to addresses throughout a data driven architecture. The data driven architecture can be comprised of one or more controllers, processors, computer, servers, proxy servers and the like. In addition, each device can be local or remote to each which can determine the type of communication employed between devices. It is to be appreciated to one skilled in the art that each device can have specific protocols and/or standards related to transmitting and/or receiving data and for the sake of brevity will not be discussed in detail.

At 930, attributes are added to the data based on the address of the data. Attributes can be added to data as it channeled throughout a network, for example. In addition, each device that receives the data can add one or more attributes to such data. In this manner, attributes can be accumulated based on the number of devices encountered within a system. Further, a device can provide specific attributes to data. For example, a proxy server may always associate visualization attributes to data received.

At 940, attributes associated with the data are determined. As noted, some data sources can provide direct data with a time stamp, for example, while other data can directly support transactional capabilities and still others can support more extensive attributes such as HMI visualization attributes with varying degrees of sophistication. In addition, some devices can perform as servers adding attributes to the data from other devices. Such attributes can be determined utilizing a device and/or process for such purpose. The attributes can be related to the source of the data, the channels employed to convey the data, visualization configuration, etc. After the attributes have been determined, they can be stored in a memory (not shown) or similar storage device to retrieve and utilize at a later time. At 950, data is selected based upon the attributes of the data.

Turning now to FIG. 10, illustrated is a methodology 1000 to receive data from a source within a network and implement such data with a requesting application. At 1010 data is located from a source within a network. The source can be a hardware device, software platform, combination of hardware and software, etc. that can transmit data utilizing various methods and/or protocols mentioned supra. In addition, data can be located from the source on a periodic basis, when a condition is met, a single time, etc. as desired. At 1020, attributes associated with the data are determined. Such attributes can relate to the associated scaling, graphics, units formatting, etc. of the data. Further, a particular data point can have various associated attributes dependent on the location of the data within the network. Thus, a data point can have an identical value with a plurality of disparate attributes relative to the path the data employed to arrive at a particular location (e.g., address) within the network.

At 1030, requirements of the requesting application are determined. Such requirements can relate to various attributes associated with the data. For example, an HMI program can require a particular data point to be displayed as a water tank, for example. Thus, the data point can have attributes associated with it that would facilitate the creation and/or display of such a graphic to the user. At 1040, the loading of the network is determined. The loading of the network can refer to a plurality of different factors such as the available memory, bandwidth, processing time, etc. available to a network. The loading of the network can be mitigated by changing the demand for data communication relative to devices connected to such a network. Such demand can vary with the type of application (e.g., requestor) requesting data from the network. For example, an ERP application may not require frequent data updates whereas an automation processor (e.g., PLC) may demand data updates on a regular basis. Thus, the type of requesting application can influence the loading demands of a particular network.

At 1050, data is implemented with the requesting application. The data that is implemented can be based on both the needs of the requesting application and the loading of the network at the time the data is requested. In this manner, the address from which the data is utilized can vary with such requirements and/or network loading demands. For example, in accordance with an aspect of the subject invention the data employed can be in response to critical dynamic load balancing of the network. Thus, if an application does not require data frequently, an address that contains such data can be employed. In this manner, network loading can be mitigated since intelligent employment of data sources can be utilized.

Figure 11:
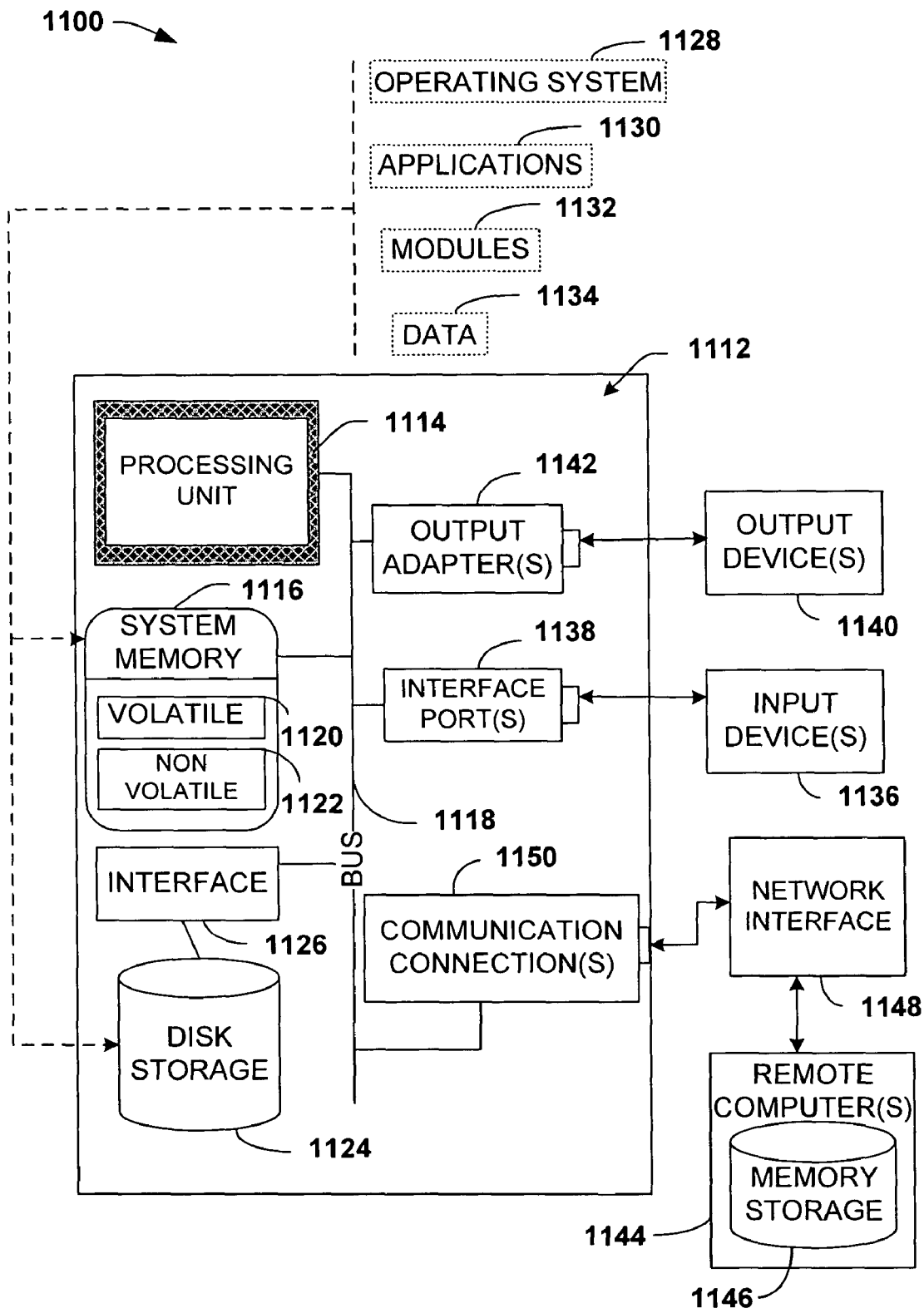
FIG. 11 illustrates an exemplary computing environment wherein the invention can be employed.

With reference to FIG. 11, an exemplary environment 1100 for implementing various aspects of the invention includes a computer 1112 is depicted. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
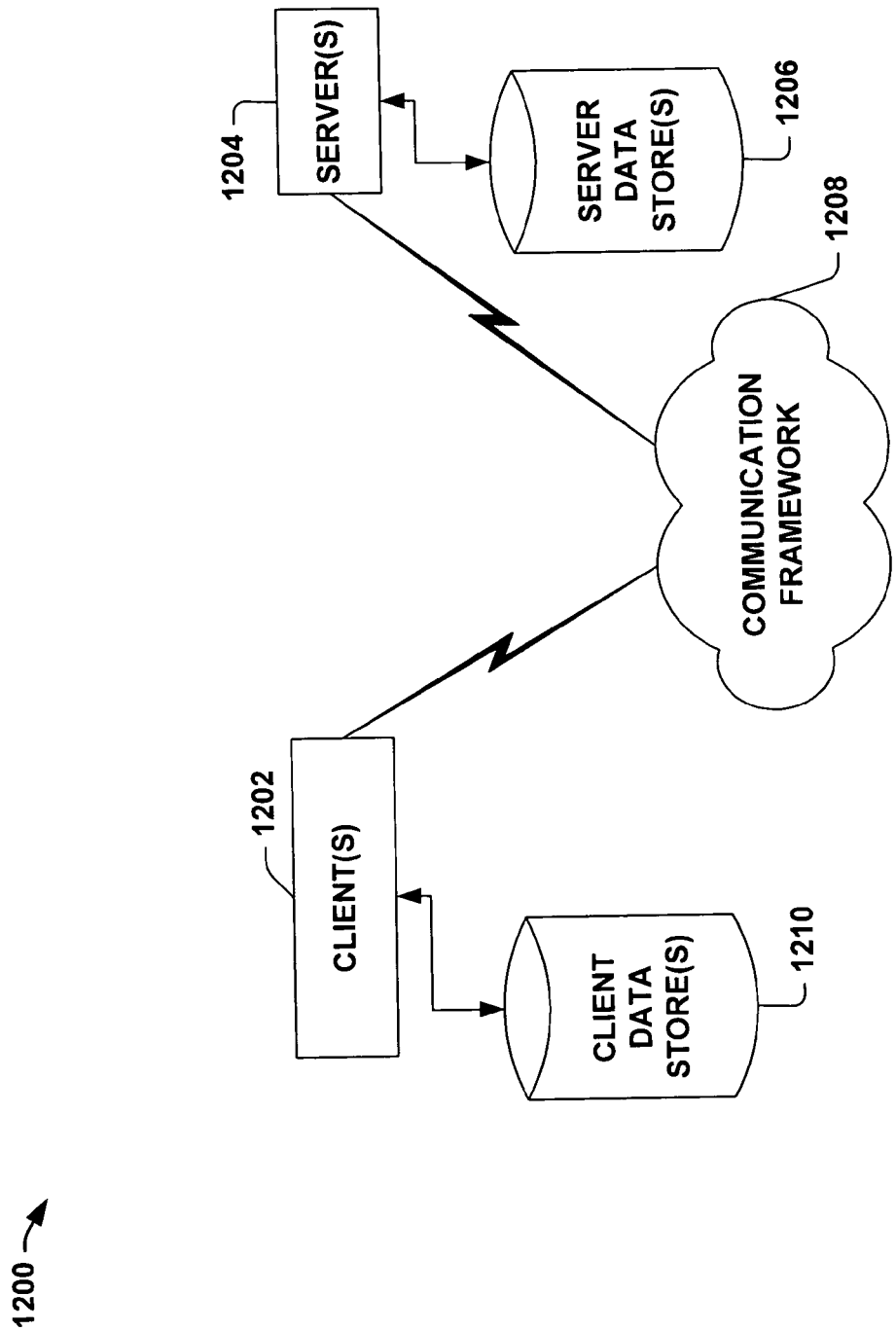
FIG. 12 illustrates an exemplary network wherein the invention can be employed.

FIG. 12 illustrates an exemplary computing environment 1200 in which the subject invention can be employed. The system 1200 includes one or more client(s) 1210. The client(s) 1210 can be hardware and/or software (e.g., threads, processes, computing devices). The system 1200 additionally includes one or more server(s) 1230. Likewise, the server(s) 1230 can be hardware and/or software (e.g., threads, processes, computing devices).

One possible communication between a client 1210 and a server 1230 can be in the form of a data packet transmitted between two or more computer processes. The system 1200 further includes a communication framework 1250 that can be employed to facilitate communications between the client(s) 1210 and the server(s) 1230. The client(s) 1210 can interface with one or more client data store(s) 1260, which can be employed to store information local to the client(s) 1210. Similarly, the server(s) 1200 can interface with one or more server data store(s) 1240, which can be employed to store information local to the servers 1230.

What has been described above includes examples of the subject invention. It is, of course, not possible to describe every conceivable combination of components or methodologies for purposes of describing the subject invention, but one of ordinary skill in the art can recognize that many further combinations and permutations of the subject invention are possible. Accordingly, the subject invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature can be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. An industrial automation system that facilitates data exchange, comprising:
    an interface that receives a request for data related to an industrial process in a factory from a requestor of a type within the industrial automation system;
    a memory that stores a source locator; and
    a processor that facilitates execution of the source locator to:
        determine the type of the requestor from a plurality of types;
        infer, based on the type of the requestor, a first metadata and a first timestamp that the requestor requires to be associated with the data;
        determine a first source to provide the data related to the industrial process, the first metadata and the first timestamp to the requestor by consultation of a directory that provides a hierarchical logical view of a plurality of sources that store the data, wherein the plurality of sources store the data with different metadata and timestamps related to different types; and
        retrieve the data from the first source for the requestor;
        wherein the source locator employs an artificial intelligence algorithm to infer the first metadata and the first timestamp.

2. The system of claim 1, wherein at least one of the plurality of sources that store the data is an industrial controller.

3. The system of claim 1, wherein the requestor is an enterprise resource planning application.

4. The system of claim 1, wherein the source locator provides a network address to the data from the first source to facilitate retrieval of the data, wherein the network address corresponds to a physical location or a logical location.

5. The system of claim 1, wherein the first metadata pertains to at least one of visualization, transaction services, scale, units, data quality parameters, transactional processing support capabilities, channels employed to convey the data or formatting.

6. The system of claim 1, wherein at least one of the plurality of sources that store the data is a controller, an intelligent controller, a server or a proxy server.

7. The system of claim 1, wherein the type of the requestor is an industrial controller.

8. The system of claim 1, wherein the source locator further determines the first source based on network loading demands.

9. The system of claim 1, wherein the plurality of sources that store the data correspond to a plurality of devices in the factory.

10. The system of claim 1, wherein the logical view is a Unified Plant Model.

11. The system of claim 1, wherein the processor executes the source locator as a background process.

12. A method, comprising:
    employing a processor to facilitate execution of computer-executable instructions stored in a non-transitory computer readable medium, to perform operations, comprising:
    receiving a request for data related to an industrial process within a factory from a requestor;
    determining a role of the requestor from a plurality of roles based on the request;
    inferring that the requestor requires a first metadata and a first timestamp to be stored with the data based on the role;
    consulting a directory that provides a hierarchical logical view of a plurality of sources for the data, wherein the plurality of sources store the data associated with different metadata and timestamps, and determining a first source from the plurality of sources that will provide the data with the first metadata and the first timestamp; and retrieving the data with the first metadata and the first timestamp from the first source and providing the data with the first metadata and the first source to the requestor, wherein the source locator employs an artificial intelligence algorithm to infer the first metadata and the first timestamp.

13. The method of claim 12, wherein determining the first source further comprises determining the first source based on network loading demands at the time the data is accessed, wherein the network loading demands are based on network resources and type of requestor.

14. The method of claim 12, wherein the requestor is an industrial controller or a proxy server.

15. The method of claim 12, wherein the metadata relates to data format, length, scale, units, visualization, data quality parameters, transactional processing support capabilities, channels employed to convey the data, or transactional capabilities.

16. A non-transitory computer-readable storage medium having stored thereon computer-executable instructions that, in response to execution, cause a computing system to perform operations, comprising:
   determining a role of an entity requesting data related to an industrial process from a plurality of roles based on a request for the data;
   inferring that the entity requesting the data requires a first metadata and a first timestamp based on the role of the entity;
   consulting a directory that provides a hierarchical logical view of a plurality of sources for the data, wherein the plurality of sources store the data associated with different metadata and timestamps;
   determining a first source from the plurality of sources that will provide the data with the first metadata and the first timestamp; and
   retrieving the data with the first metadata and the first timestamp from the first source, wherein the source locator employs an artificial intelligence algorithm to infer the first metadata and the first timestamp.

17. An apparatus comprising:
   a memory that stores computer-executable components, including:
   an interface configured to receive a request for data from an entity within an industrial automation system; and
   a source locator comprising an artificial intelligence component configured to determine a role of the entity within the industrial automation system from a plurality of roles, search a directory that stores information regarding a plurality of sources for the data in a hierarchical logical representation, wherein the plurality of sources store data with different metadata and timestamps and the information relates to the different metadata and time stamps and addresses for the plurality of sources, match a source for the data from the plurality of sources with the entity based on a first metadata and a first time stamp associated with the data and the role of the entity, and retrieve the data with the first metadata and the first time stamp from the source for the data, wherein the source locator employs an artificial intelligence algorithm to infer the first metadata and the first timestamp; and
   a processor that executes at least one of the computer-executable components.

18. The apparatus of claim 17, wherein the first metadata is related to a processing requirement.

19. The apparatus of claim 17, wherein the first metadata is related to a visualization requirement.

* * * * *